United States Patent

[11] 3,594,544

[72] Inventor Donald K. Wunderlich
 Riverdale, Ill.
[21] Appl. No. 756,549
[22] Filed Aug. 30, 1968
[45] Patented July 20, 1971
[73] Assignee Atlantic Richfield Company

[54] FLUID REACTOR PREHEATER
 5 Claims, 2 Drawing Figs.
[52] U.S. Cl............................................. 219/302,
 126/400, 165/104, 165/162, 165/163, 219/303,
 219/326, 23/260
[51] Int. Cl............................................. F24h 1/16,
 F24h 7/00
[50] Field of Search........................................ 165/104,
 163, 162; 126/400; 219/303, 326, 302; 23/260

[56] References Cited
UNITED STATES PATENTS

| | | | |
|---|---|---|---|
| 1,326,000 | 12/1919 | Schmid.......................... | 165/156 X |
| 2,048,104 | 7/1936 | Clinefelter.................... | 219/302 |
| 3,286,767 | 11/1966 | Evans............................ | 165/162 X |

*Primary Examiner*—Albert W. Davis, Jr.
*Attorney*—Morton, Bernard, Brown, Roberts & Sutherland ABSTRACT: An improved small-scale reactor preheater for heating fluid reactants. The reactants enter the preheater and downflow through a coiled tube immersed in a molten lead bath which is heated by an electrical heater.

PATENTED JUL20 1971
3,594,544
Fig. 1.
Fig. 2.
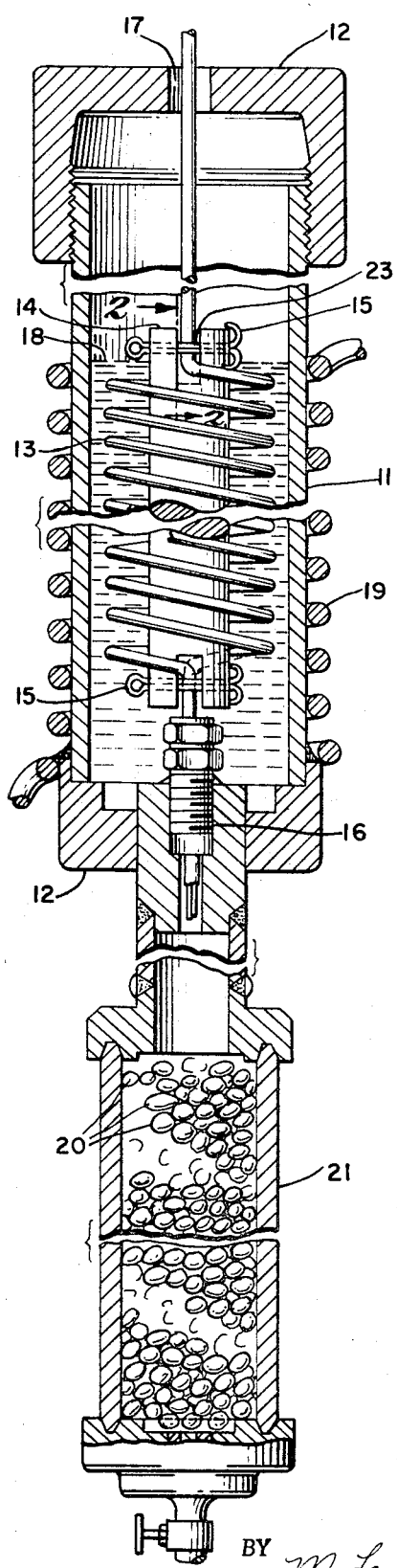
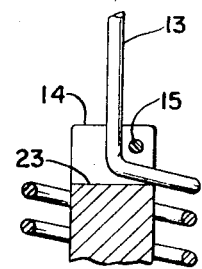
INVENTOR
DONALD J. WUNDERLICH
BY *McLean, Morton & Boustead*
ATTORNEYS

FLUID REACTOR PREHEATER

This invention relates to an improved reactor preheater. More particularly, this invention pertains to an improved small-scale reactor preheater for heating fluid reactants.

Small-scale equipment used in conducting reaction studies in the laboratory provides the opportunity for close observation and control of a reaction without the expense and space requirements of commercial size equipment. Where the reaction requires that the reactants be heated prior to entering into the reaction, however, difficulties have been encountered in constructing a small-scale preheater which provides conditions similar to those obtained in the larger commercial equipment. Such difficulties are encountered, for example, when hydrogenating hydrocarbon oil stocks.

Heretofore, preheating such reactants has involved such methods as passing the feed through a packed bed of inert material or through the grooves of a spiral insert which fits within the reactor. In the case of the packed bed preheat the temperature is monitored in a thermowell which is situated in the center of the packed bed; however, the temperature of the packed bed and of the walls of the preheater is considerably higher than the temperature read in the thermowell. As a result, the thermocouple does not give temperature readings representative of the temperature of the feed since the temperature of the feed near the walls of such a preheater is higher than that of feed passing downward near the thermowell. In addition, stocks which have a tendency to form tars or coke cause deposits in the preheat bed which ultimately block the flow. In the spiral preheater, wall temperatures are again high and uncontrolled and deposits also form in the spiral insert, blocking flow nearly as fast as with the packed preheat. In both of these prior methods of preheating, therefore, local overheating, deposit formation, and long thermal time have combined to hinder attempts to duplicate the flow characteristics of commercial operations with small-scale equipment.

The present invention is a small-scale reactor preheater consisting essentially of a coiled tube immersed in a bath of molten metal, preferably lead. Molten lead has been found to maintain a remarkably uniform temperature throughout the molten bath, allowing close control and accurate calculation of the temperature inside the preheat tube. Flow velocities approximating those of commercial equipment are achieved through proper choice of tube diameter. Due to the high-stream velocities, any tars of solids which might form are swept through the tube. Runs of several weeks have been obtained with the improved preheater under conditions which cause complete blockage of flow in conventional small-scale preheaters in 3 to 4 days. In addition, the system requires only a minimum thermal or residence time in the preheat zone.

These and other aspects and advantages of the present invention will become more apparent from the following detailed description and claims, particularly when read in conjunction with the accompanying drawing.

FIG. 1 of the drawings is an elevational view partially sectioned of a preferred embodiment of a small-scale reactor preheater in accordance with the present invention; and FIG. 2 is a fragmentary view taken along line 2-2 of FIG. 1.

Referring to the drawings there is shown an oblong cylindrical vessel 11 adapted to contain materials at high temperatures. The vessel, which comprises the heat transfer zone, is enclosed at top and bottom by means such as pipe caps 12. A coiled tube 13, fabricated of stainless steel or other suitable material, is disposed around an elongated, rigid torsion bar 14 positioned in the center of the preheat chamber. The torsion bar is manufactured of cold-rolled carbon steel or other suitable material. A solid bar is preferred, but a hollow bar may also be employed. A slot 23 is cut in each end of the torsion bar to position the coiled tube. Cotter pins 15 are inserted into the bar and so positioned as to provide resistance through the torsion bar to the reactive torque of the coiled tube. The coiled tube is attached to the base of the preheater by a suitable means such as threads 16.

Through an opening 17 in the top cap 12, the vessel is filled with molten lead to the level as shown at 18. Thermocouples located within the thermowell measure the temperature of the molten lead. Heat can be supplied by means such as an electric radiant heating coil 19 to maintain the lead in a molten condition at its melting point.

FIG. 2 of the drawings is a fragmentary vertical sectional view taken along line 2-2 of FIG. 1, showing a side view of the coiled tube 13 positioned in the slot 23 at the end of the torsion bar 14.

In operation, fluid reactants composed of, for example, a mixture of hydrocarbon feed and hydrogen-containing gases to be reacted enter the reactor through the inlet tube and downflow through the coiled section of tubing which is immersed in the molten lead. After passing through the coiled section of tubing, the preheated hydrocarbon and gas enter the solid bed of catalyst 20. The catalyst bed 20 and the remainder of the reactor 21 are of conventional design.

Satisfactory operation employing the preheater of this invention has been achieved using 15 feet of coiled tubing having an outside diameter of one-eighth inch and approximately 26 turns in the coil. The vessel employed in this embodiment is 19 inches in length from the top of the wall of the preheater to the inner bottom and has an inside diameter of 2½ inches. The vessel is filled with molten lead to a depth of 12¼ inches.

I claim:

1. A heater for heating fluid reactants comprising a heat transfer vessel, a coiled tube for passing fluid reactants through said heat transfer vessel, molten metal in said heat transfer vessel and around said coiled tube, and means for maintaining said coiled tube in a coiled condition comprising an elongated rigid member longitudinally disposed within the coils of said coiled tube and including means connected to the elongated rigid member to hold the coiled tube so as to provide resistance against the torque tending to uncoil said coiled tube during the passage of fluid through said coiled tube.

2. A heater as in claim 1 in which the molten metal is lead.

3. A heater as in claim 2 further including means for maintaining the lead at at least its melting temperature.

4. A heater as in claim 3 further including a reactor for receiving fluid reactants after passage through said coiled tube.

5. A heater for heating fluid reactants comprising a heat transfer vessel having an inlet opening and an outlet opening and adapted to hold a heated fluid, a coiled tube within said heat transfer vessel and having an inlet end passing through the inlet opening and an outlet end passing through the outlet opening, a torsion bar encircled by and substantially coaxial with the coils of said coiled tube and having first and second ends, first and second retention means connected respectively to the first and second ends of said torsion bar to hold said coiled tube adjacent respectively the inlet end and the outlet end to resist uncoiling of the coiled tube, and an electrical heating coil encircling said heat transfer vessel and adapted for connection to a source of electricity to provide heat to said heat transfer vessel.